E. E. WINKLEY.
CONTROLLING MECHANISM FOR AUTOMATIC MACHINES.
APPLICATION FILED AUG. 20, 1908.

1,110,662.

Patented Sept. 15, 1914.
3 SHEETS—SHEET 1.

Fig. 1.

Witnesses:
E. C. Wurdeman
A. C. Richardson

Inventor:
Erastus E. Winkley
by
Phillips Van Everen & Fish
Atty

E. E. WINKLEY.
CONTROLLING MECHANISM FOR AUTOMATIC MACHINES.
APPLICATION FILED AUG. 20, 1908.

1,110,662.

Patented Sept. 15, 1914.

UNITED STATES PATENT OFFICE.

ERASTUS E. WINKLEY, OF LYNN, MASSACHUSETTS.

CONTROLLING MECHANISM FOR AUTOMATIC MACHINES.

1,110,662.  Specification of Letters Patent.  Patented Sept. 15, 1914.

Application filed August 20, 1908. Serial No. 449,409.

*To all whom it may concern:*

Be it known that I, ERASTUS E. WINKLEY, citizen of the United States, residing at Lynn, in the county of Essex and State of Massachusetts, have invented certain new and useful Improvements in Controlling Mechanism for Automatic Machines; and I do hereby declare the following to be a full, clear, and exact description of the invention, such as will enable others skilled in the art to which it appertains to make and use the same.

The invention relates to a controlling mechanism for automatic machines or apparatus which is well adapted for use in automatically maintaining the proper angular relation between the work and tool, or between the work and feed mechanism, of machines in which the tool operates progressively along the work, the term "tool" being used to designate any instrument or combination of instrumentalities for operating on the work. Machines of this character are extensively used in the manufacture of boots and shoes for performing various operations upon the shoe soles or other parts connected or to be connected therewith, and it is one object of the invention to provide a novel and improved mechanism for automatically correcting the angular relation of the work and tool in such machines so that the tool is automatically maintained in proper angular relation to the surface of the work, or to the line of feed, as its point of operation progresses along the work.

Many of the machines of the character above indicated are provided with feeding means constructed to cause a relative movement of the tool and work in the general direction of the periphery of a shoe sole, and the prescribed travel of the tool along the work is secured by relatively swinging the tool and work to correct their angular relation in accordance with the curvature of the sole, the relative swinging movements being usually effected by the operator, who swings the work as the feed progresses to maintain the edge of the sole or some marginal channel or abutment thereon in engagement with a suitable gage. In these machines the periphery of a sole, or the marginal abutment with which the gage contacts during the action of the feeding means, constitutes a form for determining the path of travel of the tool along the work.

It is a further object of the invention to provide novel and improved mechanism for controlling the corrective swinging movements in such machines by the contour of the form.

One feature of the invention accordingly contemplates the provision in a machine provided with feeding means for effecting a relative travel of a tool along the work in the direction of the periphery of a form, of mechanism controlled by the contour of the form for relatively swinging the feeding means and work in either direction to cause the path of travel of the tool along the work to correspond to the contour of the form. Broadly considered, the form may be the periphery of the article to be operated upon, as for instance in a machine for operating upon the marginal portion of a sole blank, or the form may be a pattern separate and distinct from the work. The relative feeding movement of the feeding means and the form and work, and the relative swinging movements, may be caused by movement of either the feeding means or of the form and work.

In the machine whose operation the invention is more particularly designed to improve and render automatic, the feeding means is constructed to impart movement to the work and the proper path of travel of the tool along the work is secured by swinging the work. In embodying the invention in these machines it is preferred to employ feeding means similar to the feeding means usually employed in machines for doing the same work and to provide means for automatically swinging the work and form in accordance with the contour of the form.

The broader features of the invention contemplate the provision of any suitable mechanism for controlling the relative swinging or angular movements of the work and feeding means, or of the work and tool, by the contour of the form. It is preferred, however, to employ for this purpose a mechanism embodying certain further features of invention. In accordance with one of these features, the relative swing or other angular movements are controlled by a feeler arranged to engage the form, and by its position determine the corrective movement requisite for causing the path of travel of the tool along the work to conform to the outline of the form, or for maintaining the tool in proper angular relation to the work.

The mechanism which is controlled by the feeler, and which produces the swinging or the angular movements, is preferably constructed to operate intermittently as the feed progresses, the correcting movement effected at each operation being determined by the feeler in advance of such operation. The mechanism is also preferably constructed to effect a swinging or angular movement in either direction dependent upon the curvature of the form directly in advance of the point corresponding to the point of operation of the tool.

The various features of the invention will be readily understood from an inspection of the accompanying drawings, in which—

In the drawings the invention is shown embodied in a machine for operating upon the marginal portion of a shoe sole, the particular operation which the machine is designed to perform being the cutting of a channel in the surface of the sole at a definite distance from its edge or periphery. The machine is provided with a channeling knife 1, a gage 2, and feed wheels 3 and 4, these parts being constructed and arranged as is usual in machines for cutting the channel in outsoles for boots and shoes. In order that the feed wheels may effectively grip and feed the work, and may be readily separated for the removal and introduction of the shoe sole, the shaft 5 to which the upper feed wheel is secured is mounted in a vertically movable bearing 6 and is held in normal position by a spring 7. The feed wheels may be separated by a cam 8 arranged to engage a pin 9 projecting from the bearing 6, and the cam is provided with an operating handle 10 arranged within convenient reach of the operator. The wheel carrying shaft 5 is connected by a universal joint 11 with a shaft 12, which is connected through gearing 13 with the shaft 14 which carries the lower feed wheels. The feed wheels are continuously driven during the operation of the machine through a shaft 15 which is connected by beveled gears 16 with the shaft 14, and is provided at its lower end with a worm wheel 17 engaging a worm 18 secured to the driving shaft 19. The driving shaft is provided with a clutch member 20 arranged to engage a clutch member formed on the driving pulley 21, and a lever 22 is provided for throwing the driving clutch into and out of action.

In operating machines of the type illustrated in which the path of travel of the tool along the work corresponds to the contour of a shoe sole, it is customary for the operator to swing the work as it is advanced by the feed wheels or other feeding devices so that the edge of the sole is continuously in contact with the gage, in order that the work may be properly presented to the operating tool. In accordance with the present invention, the swinging of the work as it is advanced by the feeding devices, so that the path of travel of the operating tool along the work will correspond to the contour of the sole, is automatically effected, and the attention of the operator during the operation of the machine upon the work is not required.

In the construction shown, the sole A to be operated upon is supported in a carrier comprising two clamping plates 23 and 24 between which the sole is held. In order that the sole may move freely in any direction in the plane of operation, the carrier is mounted in the free end of a frame 25, the other end of which is pivotally supported upon a vertical shaft 26 which is mounted in the end of a second frame 27, the other end of which is pivotally supported upon a vertical shaft 28 mounted in fixed bearings in the frame of the machine. In order that the carrier may be swung about an axis at right angles to the operating plane as it is moved in the operating plane by the feeding devices, the carrier is pivotally supported to turn about a vertical axis in the frame 25. The pivotal support for the carrier in the end of the frame 25 consists of a shaft 29 carrying the lower clamping plate 23, and a sectional shaft 30 to which the upper clamping plate 24 is connected. The two sections of the shaft 30 are connected by a coupling 31 which allows a vertical movement of the clamping plate 24. The clamping plate is forced yieldingly toward the clamping plate 23 by a spring 32 interposed between the two sections of the shaft 30. The clamping plate 24 may be readily raised to allow the removal or insertion of a sole blank between the clamping plates by pressing together the two handles 33 and 34 which project respectively from the bearing in which the upper section of the shaft 30 is mounted, and from the hub 35 by which the clamping plate 24 is secured to the lower section of the shaft.

The swinging movements of the work carrier requisite for securing the proper presentation of the work to the tool as it is advanced by the feeding devices are effected by turning the shafts 29 and 30, which are arranged in axial alinement with each other. The connections through which the turning movements are effected are as follows. Radially projecting arms 36 and 37 are secured to the ends of the shafts 29 and 30, and these arms are connected by means of links 38 with arms 39 secured to the opposite ends of the vertical shaft 26. The arms 39 are also connected by links 40 with arms 41 secured to the opposite ends of the vertical shaft 28. The arms 36 and 37 at the opposite ends of the pivotal support for the carrier are arranged at an angle of 90° with each other, and the arms at the opposite ends of the shafts 26 and 28 are similarly arranged to avoid dead centers in the connections through which motion is transmitted from the shaft 28 to the work carrier. These connections not only act as means for transmitting swinging movements to the carrier, but also act as means for retaining the carrier and work in a constant angular position as it is moved bodily in the operating plane, so that the movements imparted to the work and carrier by the feeding devices do not change the angular position of the work, or produce a swinging movement of the work.

The swinging movements imparted to the work carrier and work are controlled by the curvature of the sole blank, the periphery of which constitutes a form or pattern for determining the path of movement of the tool along the surface of the sole. In the construction shown, the controlling mechanism comprises a feeler finger 42 arranged to engage the edge of the sole in advance of the point of operation of the knife, and operating to control the action of a mechanism which imparts rotary movements to the shaft 28 and from it through the connections described to the shafts 29 and 30, on which the carrier which carries the work and controlling form is mounted. The position of the feeler finger will depend upon the curvature of the edge of the sole between the point where it engages the gage 2 and the point where it engages the controller finger. The mechanism which is controlled by the feeler finger is so constructed and actuated that it will operate to swing the sole about the point of operation of the knife during the advance of the sole through a distance substantially equal to the distance between the point of engagement of the feeler finger and the point of operation of the knife, the swinging movement being that which is required to keep the periphery of the sole in contact with the gage as the sole advances.

The mechanism for actuating the shaft 28 to impart swinging movements to the sole comprises an intermittently operating actuating mechanism, the operation and extent of movement of which depends upon the position of the feeler finger when in engagement with the periphery of the sole. The actuating mechanism shown comprises two ratchet wheels 43 and 44 secured to a shaft 45 which is connected through gearing 46 with a vertical shaft 47, the upper end of which carries a gear 48 engaging a pinion 49 secured to the shaft 28. The teeth of the ratchet wheel are oppositely arranged, and are engaged at intervals by two oppositely arranged pawls 50 and 51 which are pivotally mounted upon a pawl carrying block 52. The pawl carrying block 52 is mounted in a radially extending slot formed in the pawl carrying arm 53 which is mounted to turn freely about the shaft 45. The pawl carrying arm is held yieldingly in mid-position by means of a spring pressed yoke 54, the arms of which engage arms 55 which extend in opposite directions from the hub of the pawl carrying arm. The pawl carrying block 52 is connected with a plate 56, the upper end of which is provided with two laterally extending arms 57 between which the upper ends of the pawls lie. A pin 58 projects from the plate 56 between the end of the pawls, and the pawls are held in engagement with this pin by springs 59. The plate 56 is moved vertically at proper intervals to engage the pawls with and disengage them from the ratchet wheels, through a bell crank lever 60, one end of which is connected with the plate 56 by a link 61, and the other end of which carries a roll engaging a cam groove formed in a disk 62 secured to the shaft 19. If the pawl carrying arm 50 is rocked in either direction when the pawls are in engagement with the ratchets, the shaft 45 will be rotated in a direction corresponding to the direction in which the pawl carrying arm is moved, and this movement will be transmitted through the connections described to the work carrier, and will cause a swinging of the work about the point of operation of the cutter corresponding to the movement imparted to the pawl carrying arm.

Figure 1:
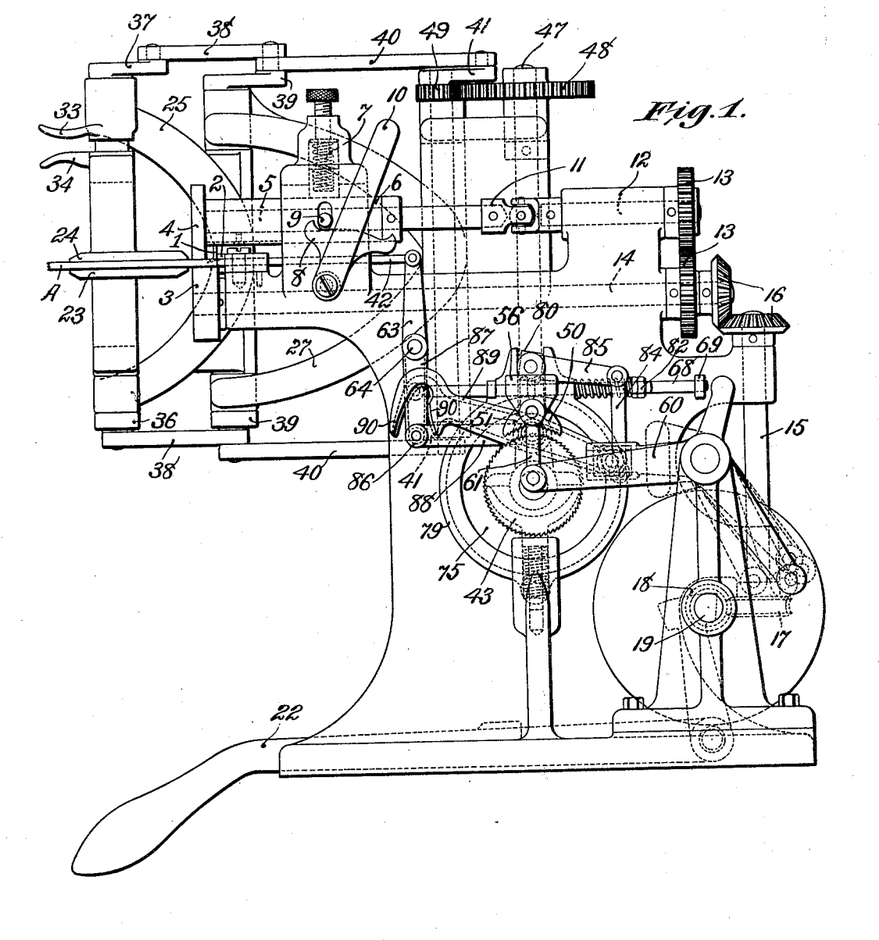
Figure 1 is a side elevation of a machine for channeling outsoles of boots and shoes embodying the invention in its preferred form.
Figures 2, 4:
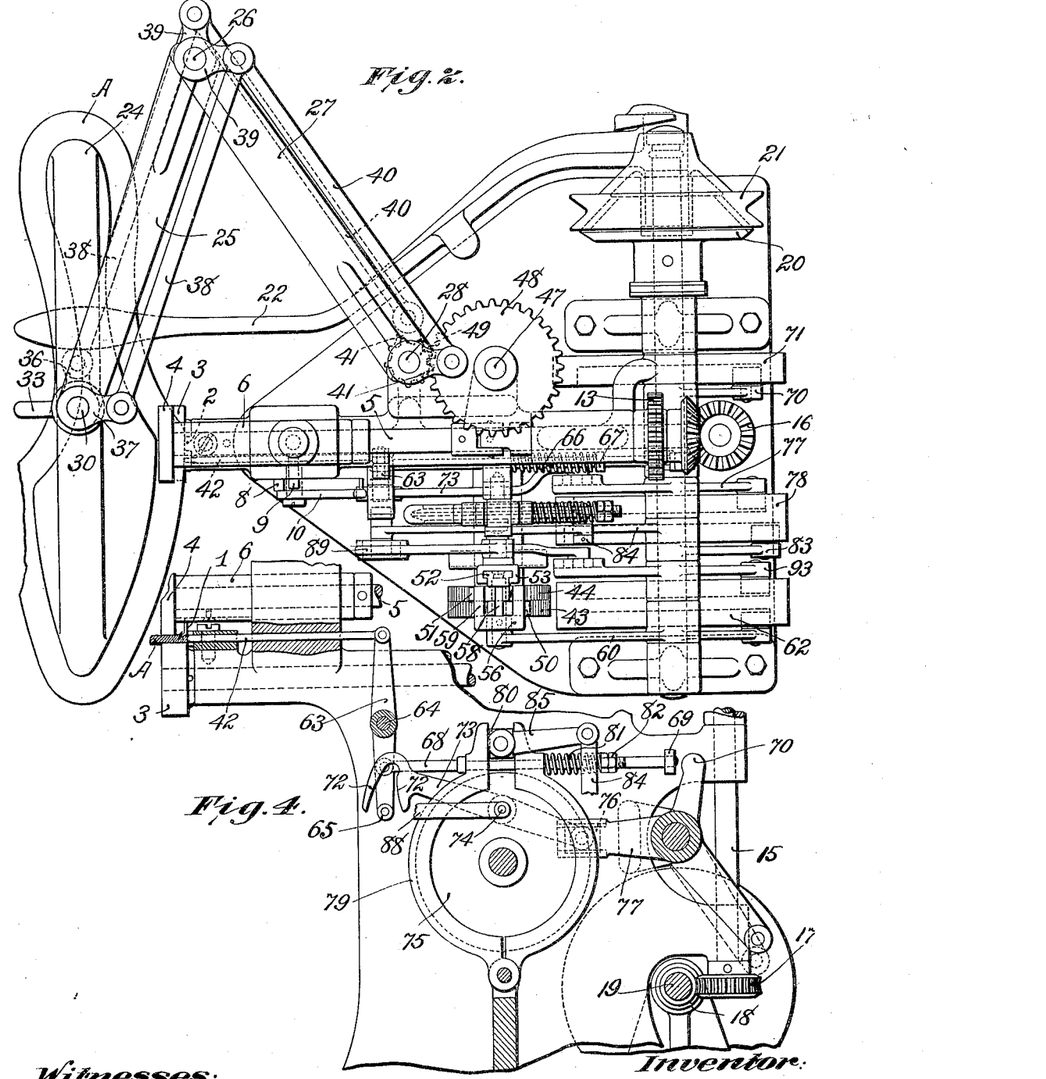
Fig. 2 is a plan view of the machine.
Fig. 4 is a transverse sectional elevation.
Figure 3:
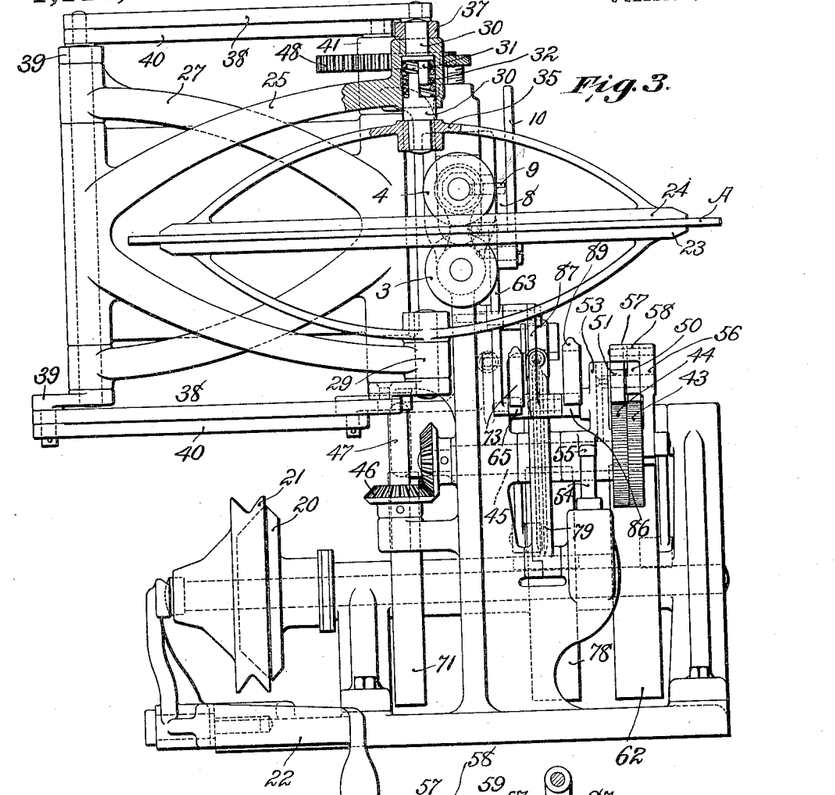
Fig. 3 is a front elevation.
Figure 5:
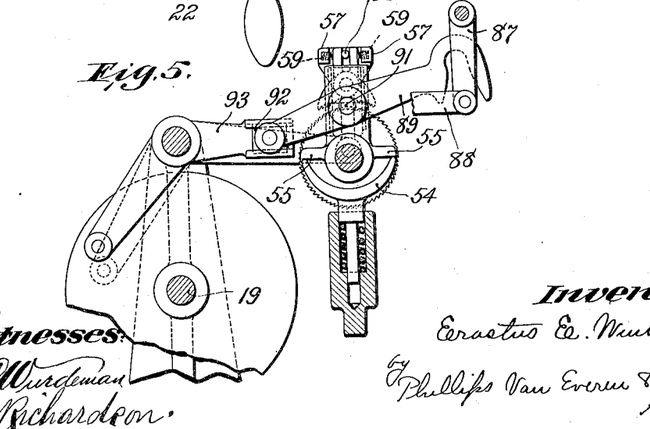
Fig. 5 is a detail showing a part of the controlling mechanism.

The direction and extent of movement imparted to the pawl carrying arm is determined by the position of the feeler finger 42 through the following mechanism. The rear end of the finger 42 is pivotally connected to the upper end of a lever 63 pivoted on a stud 64 and carrying a roll 65 on its lower end. The feeler finger is held yieldingly in engagement with the periphery of the sole by a spring 66 (Fig. 2) which is interposed between a fixed lug on the frame and a collar 67 formed on a rod 68, the front end of which is pivotally connected to the lower arm of the lever 63. The rear end of the rod is supported in a bearing 69, and is arranged to be engaged by the upper end of a lever 70, the lower arm of which is provided with a roll engaging a cam groove formed in the disk 71 which is secured to the shaft 19. The arm 70 is operated to force forward the rod 68 and thus withdraw the feeler finger 42 after the feeler finger has acted to locate devices which determine the direction and extent of movement of the pawl carrying arm 50, and to hold the finger in retracted position while the actuating mechanism operates to effect the swinging of the work. After the swinging movement has been completed the feeler finger is allowed to advance so that it engages the periphery of the sole and acts to determine the direction and extent of the next swinging movement which is to be imparted to the work.

The roll 65 at the end of the lower arm of the lever 63 is arranged to coöperate with two oppositely inclined surfaces 72 formed on the end of an actuator lever 73. The lever is pivoted at 74 to a disk 75 which is mounted to turn freely upon the shaft 45, and the rear end of the lever is pivotally connected to a block 76 mounted in a guiding slot formed in one arm of a lever 77. The other arm of the lever 77 carries a roll engaging a cam groove formed in a disk 78 which is secured to the shaft 19. Through these connections the actuator lever 73 is oscillated at regular intervals to carry the surfaces 72 down on opposite sides of the roll 65. As the surfaces 72 pass down on opposite sides of the roll 65, one or the other of the surfaces will engage the roll, in case it occupies a position to either side of its mid-position, and by the engagement of one or the other of these surfaces with the roll, the lever 73 will be moved either forward or back, as the case may be. This movement of the lever will cause the disk 75 to be turned in one direction or the other, according to the position of the roll 65. This movement of the disk 75 operates to position a device which determines the movements imparted to the pawl carrying arm 53. Immediately after this device has been positioned, it is firmly held in this position by clamping the disk 75. The lever 73 may then be raised so that the feeler finger 42 is free to be retracted and thereafter to re-engage the periphery of the sole. The means for clamping the disk 75 comprises two clamping shoes 79 embracing the V-shaped edge of the disk. The shoes are moved out of engagement with the disk when the actuator lever 73 is operated to engage the roll 65 by a pivoted spreader block 80 which is mounted between the upper ends of the brake shoes. The brake shoes are forced toward each other to clamp the disk 75 by means of a spring 81 interposed between one of the brake shoes and nuts 82 carried on the end of a bolt which passes through the brake shoes.

The spreader block 80 is operated at proper intervals to disengage the brake shoes from the disk 75 by means of a cam groove formed in the disk 78, which operates upon a roll carried by one arm of a lever 83, the other arm of which is connected by a link 84 with an arm 85 projecting from the spreader block.

The device which is locked by the movement of the disk 75 comprises a roll 86 carried on the lower end of an arm 87 which is pivotally supported on the stud 64, and is connected by a link 88 with the disk 75. The position of the roll 86 will depend upon the movements imparted to the disk 75 by the actuator lever 73 coöperating with the locating roll 65. The pawl carrying lever 53 is operated by an actuator lever 89 similar in construction to the actuator lever 73, and provided with oppositely inclined surfaces 90 arranged to pass on opposite sides of the roll 86 when the lever is vibrated. The actuator lever 89 is pivotally connected at 91 to the pawl carrying lever 53, and the rear end of the lever is pivotally connected to a block 92 which is mounted in a guideway formed in one arm of a lever 93. The lever 93 is rocked to vibrate the actuator lever by means of a cam groove formed in the disk 62 and engaging a roll carried on the lower end of the lever. When the front end of the lever is moved downward, one or the other of the inclined surfaces 90 will act by engagement with the roll 86 to move the actuator lever forward or back, according to the position of the roll, and will thus rock the pawl carrying arm 53 in a direction and to an extent depending upon the position into which the roll 86 has been moved. At the time that the actuator lever 89 is thus rocked, the pawls are in engagement with the ratchet wheels, and a swinging movement will therefore be imparted to the sole A, depending upon the location of the roll 86 as determined by the engagement of the feeler 42 with the periphery of the sole. Thus during the advance of the sole in the direction of its periphery by the feed wheels, the sole will be automatically swung at rapidly recurring intervals to keep the edge of the sole in contact with the gage, and to cause the path of travel of the tool to correspond to the contour of the sole, by mechanism the action of which is controlled by the curvature of the sole.

While I have shown the invention embodied in a machine in which the periphery of the blank being operated upon constitutes the form or pattern for determining the path of travel of the tool along the work, it will be understood that the invention is not confined in its application to a machine of this type, and that a separate pattern or form may be employed for determining the path of travel of the tool along the work, without departing from the broader features of the invention.

It will also be understood that it is not essential to the broader features of the invention that the travel of the tool along the work shall be caused by a movement of the work, or that the relative swinging movements between the work and feeding means, or between the work and tool should be effected by a swinging of the work.

It will also be understood that the invention is not limited to the specific construction and arrangement of the parts shown and described, except so far as such construction and arrangement is referred to in the claims.

Having explained the nature and object of the invention, and specifically described one form of machine in which it may be embodied, what I claim is:—

1. An automatic machine, having, in combination, a tool, feeding means for causing a relative travel of the tool along the work in the direction of the periphery of a form, and mechanism other than the form and controlled by the curvature of the form for relatively swinging the feeding means and work in either direction to cause the path of travel of the tool along the work to correspond to the contour of the form, substantially as described.

2. An automatic machine, having, in combination, a tool, means for moving the work to transfer the point of operation of the tool along the work in the direction of the periphery of a form, and mechanism other than the form and controlled by the curvature of the form for relatively moving the tool and work in either direction to correct the angular relation between the tool and work as the point of operation progresses along the work, substantially as described.

3. An automatic machine, having, in combination, a tool, feeding means acting to transfer the point of operation of the tool along the work in the direction of the periphery of a form, and mechanism other than the form and controlled by the curvature of the form acting to automatically swing the work in either direction in accordance with the curvature of the form, substantially as described.

4. A feeding mechanism for automatic machines, having, in combination, a gage arranged to engage the periphery of a form, a feeler arranged to engage the form, feeding means for causing a relative travel of the gage and feeler along the periphery of the form, and mechanism controlled by the feeler for relatively swinging the feeding means and form in either direction to keep the gage and form in contact, substantially as described.

5. An automatic machine, having, in combination, means for operating on the work, means for feeding the work to transfer the point of operation of the operating means along the work, and means controlled by a contour of the work for relatively swinging the work and operating means in either direction in accordance with the curvature of said contour, substantially as described.

6. An automatic machine, having, in combination, a tool, feeding means acting to transfer the point of operation of the tool along the work in the direction of the periphery of a form, and automatic means controlled by the curvature of the form acting independently of the feeding movement to relatively swing the feeding means and form in either direction in conformity with said curvature, substantially as described.

7. An automatic machine, having, in combination, a form support, a gage, a feeding mechanism acting to cause a relative transfer of the gage along the form, and mechanism controlled by the contour of the form for relatively swinging the feeding mechanism and form in either direction in accordance with the curvature of the form to maintain the gage in engagement with the form, substantially as described.

8. An automatic machine, having, in combination, a tool and work support relatively movable to transfer the point of operation of the tool along the work in the direction of the periphery of a form, feeding mechanism, and mechanism other than the form and controlled by the form acting to relatively swing the feeding mechanism and work carrier in accordance with the curvature of the form as the point of operation of the tool is transferred along the work, substantially as described.

9. A controlling mechanism for automatic machines, having, in combination, a movable feeler arranged to engage and be controlled by a relatively moving form, and an actuating mechanism for transmitting motion controlled but not operated by the feeler the extent and direction of movement of which depends upon the position of the feeler, substantially as described.

10. A controlling mechanism for automatic machines, having, in combination, a feeler arranged to engage a relatively moving form, an actuating mechanism for transmitting motion, a device the position of which determines the extent and direction of movement of the actuating mechanism, and means for positioning said device in accordance with the position of the feeler, substantially as described.

11. A controlling mechanism for automatic machines, having, in combination, a feeler arranged to engage a relatively moving form, an actuating mechanism for transmitting motion, a device the position of which determines the action of the actuating mechanism, and means for positioning said device in accordance with the position of the feeler and locking it in position during the action of the actuating mechanism, substantially as described.

12. An automatic machine, having, in combination, a tool, a work carrier mounted for free movement in the operating plane, feeding mechanism, and mechanism controlled by a contour of the work for swinging the carrier about the point of operation of the tool, substantially as described.

13. An automatic machine, having, in combination, a tool, a work carrier, mechanism for feeding the work past the tool, and mechanism for controlling the direction of the feed by a contour on the work, substantially as described.

14. A machine of the class described, having, in combination, a tool, means for relatively moving the tool and work to transfer the point of operation of the tool along the work, correcting mechanism for relatively moving the tool and work in either direction to correct the angular relation of the tool and work, and a form engaging feeler and connections through which the correcting mechanism is rendered active by a variation in the position of the feeler as its point of engagement is transferred along the form, substantially as described.

15. A machine of the class described, having, in combination, a tool and a work support relatively movable to transfer the point of operation of the tool along the work, correcting mechanism for relatively moving the tool and work in either direction to correct the angular relation of the tool and work, and a form engaging feeler and connections through which the correcting mechanism is rendered active by a variation in the position of the feeler as its point of engagement is transferred along the form, substantially as described.

16. A machine of the class described, having, in combination, a tool and a work support relatively movable to transfer the point of operation of the tool along the work, correcting mechanism for relatively moving the tool and work in either direction to correct the relative position of the tool and work, a plurality of form engaging devices, and connections through which the correcting mechanism is rendered active by a variation in the relative position of the engaging devices as their points of engagement are transferred along a form, substantially as described.

17. A machine of the class described, having, in combination, a tool, means for relatively moving the tool and work to transfer the point of operation of the tool along the work, correcting mechanism for relatively moving the tool and work in either direction to correct the relative position of the tool and work, a plurality of form engaging devices, and connections through which the correcting mechanism is rendered active by a variation in the relative position of the engaging devices as their points of engagement are transferred along a form substantially as described.

18. A machine of the class described, having, in combination, a tool and a work support relatively movable to transfer the point of operation of the tool along the work, correcting mechanism for relatively moving the tool and work in either direction to correct the relative position of the tool and work, form engaging devices arranged one in advance of the other, and connections through which the correcting mechanism is rendered active by a variation in the relative position of the engaging devices as their points of engagement are transferred along a form, substantially as described.

19. A machine of the class described, having, in combination, a tool, means for relatively moving the tool and work to transfer the point of operation of the tool and work, correcting mechanism for relatively moving the tool and work in either direction to correct the relative position of the tool and work, a form engaging feeler arranged to engage and be controlled in its movement by the contour of the form, and connections through which the correcting mechanism is rendered active by variations in the position of the feeler as its point of engagement is transferred along the form, substantially as described.

20. An automatic machine, having, in combination, means for operating upon the marginal portion of a sole blank, means for feeding the blank, means for automatically swinging the blank in either direction, and means engaging the margin of the blank for controlling the operation of the blank swinging means, substantially as described.

21. An automatic machine, having, in combination, means for operating upon the marginal portion of a sole blank, means for feeding the blank, a movable feeler engaging the edge of the blank, and means co-operating with the feeler to swing the blank in either direction, substantially as described.

22. An automatic machine, having, in combination, means for operating upon the marginal portion of a sole blank, means for feeding the blank, and means acting independently of the feed to swing the blank in either direction, substantially as described.

23. An automatic machine, having, in combination, means for operating upon the marginal portion of a sole blank, means for feeding the blank, and automatic means controlled by the curvature of the margin of the blank acting independently of the feed to swing the blank in either direction in conformity with said curvature, substantially as described.

24. In a machine of the class described, a work support, a tool constructed and arranged to operate upon a shoe sole, a feeler engaging a contour of the sole, and means controlled but not operated by the feeler for relatively moving the tool and sole in either direction to maintain the tool in predetermined angular relation to said contour, substantially as described.

25. A controlling mechanism for automatic machines, having, in combination, a power driven correcting mechanism, a form engaging feeler arranged to engage and be controlled in its movement by the contour of a form, and connections through which the direction and extent of movement of the correcting mechanism is determined by the position of the feeler as its point of engagement is transferred along the form, substantially as described.

26. A machine of the class described, having, in combination, means for operating upon the work, a feeler acting along a contour of the work, and mechanism for relatively moving the operating means and work in either direction to correct the angular relation of the operating means and work controlled by the feeler, substantially as described.

27. A machine of the class described, having, in combination, means for operating upon the work, mechanism for imparting relative movements to the work and operating means to maintain them in correct angular relation at the point of operation, a feeler acting along a contour of the work, and connections between the feeler and correcting means for determining the extent and direction of the corrective movements, substantially as described.

28. A machine of the class described, having, in combination, means for operating upon the work, means for transferring the point of operation along the work, mechanism operating at regular intervals to impart relative movements to the work and operating means to maintain them in correct relation at the point of operation, a feeler acting along a contour of the work adjacent to the point of operation, and connections between the feeler and correcting mechanism for determining the corrective movements, substantially as described.

29. A machine of the class described, having, in combination, means for operating upon the work, means for transferring the point of operation along the work, a feeler acting along a contour of the work adjacent to the point of operation, mechanism acting at regular intervals during the operation of the operating means for changing the relative position of the operating means and work, and devices connected with the feeler for determining the actuating movements of said mechanism, substantially as described.

30. A machine of the class described, having, in combination, means for operating upon the work, a feeler arranged to engage the work along the path of the operating means, mechanism acting at regular intervals during the operation of the operating means to relatively turn the work and operating means to maintain them in correct relation, and devices connected with the feeler for determining the turning movement produced at each operation of the turning mechanism, substantially as described.

31. A machine of the class described, having, in combination, means for operating upon the work, a feeler acting along a contour of the work, mechanism operating at regular intervals for swinging the work, and devices connected with the feeler for determining each work swinging movement of said mechanism, substantially as described.

32. A machine of the class described, having, in combination, means for operating upon and feeding the work, mechanism acting at regular intervals to relatively turn the work and operating means to maintain them in correct relation, a feeler acting along the work in advance of the point of operation of the operating means a distance substantially equal to the feed between successive operations of the turning mechanism, and connections between the feeler and turning mechanism through which the feeler determines the movements effected by the turning mechanism, substantially as described.

33. A machine of the class described, having, in combination, means for operating upon the work, means for relatively moving the operating means and work to transfer the point of operation along the work, correcting mechanism for relatively moving the operating means and work in either direction to correct the angular relation of the operating means and work, a feeler acting along the contour of the work, and connections through which the correcting mechanism is rendered active by a variation in the position of the feeler as its point of engagement is transferred along the work, substantially as described.

34. A machine of the class described, having, in combination, means for operating upon the work, means for relatively moving the work and operating means to transfer the point of operation along the work, correcting mechanism for relatively moving the operating means and work in either direction to correct the relative position of the operating means and work, a plurality of work engaging devices arranged to act along a contour of the work, and connections through which the correcting mechanism is rendered active by a variation in the relative position of the work engaging devices as their points of engagement are transferred along the contour, substantially as described.

35. A controlling mechanism, having, in combination, a feeler arranged to act along a form, an actuating mechanism, a controlling device the position of which determines the movement imparted by the actuating mechanism, connections for positioning the device in accordance with the position of the feeler, and means for locking said device and releasing the feeler during the operation of the actuating mechanism, substantially as described.

36. A controlling mechanism, having, in combination, a feeler arranged to act along a form, a controller device connected to be positioned by the feeler, a second controller device, mechanism coöperating with the first device to position the second device, mechanism for locking the second device and releasing the first device and feeler, and an actuating mechanism the action of which depends upon the position of the second device, substantially as described.

37. A controlling mechanism, having, in combination, a feeler arranged to act along a form, a controller device positioned by the feeler, an actuating mechanism, mechanism coöperating with the device positioned by the feeler for setting the actuating mechanism to impart a movement depending upon the position of said device, and means for maintaining the set of the actuating mechanism and releasing the feeler during the operation of the actuating mechanism, substantially as described.

38. A machine of the class described, having, in combination, means for operating upon the work, feeding means for causing a relative travel of the operating means along the work in the direction of the periphery of a form, and mechanism controlled by the contour of the form for relatively swinging the feeding means and work in either direction about the point of operation to cause the path of travel of the tool along the work to correspond to the contour of the form, substantially as described.

39. An automatic machine, having, in combination, means for operating on the work, means for feeding the work to transfer the point of operation of the operating means along the work, and means controlled by a contour of the work for relatively moving the work and operating means in either direction in accordance with said contour, substantially as described.

40. A machine in which a tool is caused to operate progressively along the work comprising a tool and means controlled by engagement with the work to swing the work automatically in either direction with relation to the tool to maintain at the point of operation a predetermined relative position of work and tool, substantially as described.

41. A machine in which a tool is caused to operate progressively along the work comprising a tool and means controlled by engagement with the work to relatively swing the tool and work automatically in either direction to maintain at the point of operation a predetermined relative position of tool and work, substantially as described.

In testimony whereof I affix my signature, in presence of two witnesses.

ERASTUS E. WINKLEY.

Witnesses:
WARREN G. OGDEN,
ANNIE C. RICHARDSON.

---

Copies of this patent may be obtained for five cents each, by addressing the "Commissioner of Patents, Washington, D. C."